US009319541B2

(12) United States Patent
Goto

(10) Patent No.: US 9,319,541 B2
(45) Date of Patent: Apr. 19, 2016

(54) FACSIMILE APPARATUS CAPABLE OF DATA FORWARDING AND DATA FORWARDING METHOD

(71) Applicant: Brother Kogyo Kabushiki Kaisha, Nagoya (JP)

(72) Inventor: Shinya Goto, Handa (JP)

(73) Assignee: Brother Kogyo Kabushiki Kaisha, Nagoya-Shi (JP)

(*) Notice: Subject to any disclaimer, the term of this patent is extended or adjusted under 35 U.S.C. 154(b) by 0 days.

(21) Appl. No.: 14/498,251

(22) Filed: Sep. 26, 2014

(65) Prior Publication Data

US 2015/0092250 A1    Apr. 2, 2015

(30) Foreign Application Priority Data

Sep. 27, 2013   (JP) .................................. 2013-201715

(51) Int. Cl.
*H04N 1/32*     (2006.01)
*H04N 1/00*     (2006.01)

(52) U.S. Cl.
CPC ....... *H04N 1/00408* (2013.01); *H04N 1/00206* (2013.01); *H04N 1/3239* (2013.01)

(58) Field of Classification Search
CPC .......... H04N 1/32406; H04N 1/00209; H04N 1/32411; H04N 1/00408; H04N 2201/3256; H04N 2201/0093; H04N 2201/3278
See application file for complete search history.

(56) References Cited

U.S. PATENT DOCUMENTS

| 2007/0268526 | A1* | 11/2007 | Ito | ...................... | H04N 1/00214 358/403 |
| 2008/0204485 | A1* | 8/2008 | Matsumoto | .......... | B41J 2/16517 347/5 |
| 2012/0257734 | A1* | 10/2012 | Sun | .................... | H04N 1/00217 379/100.09 |

FOREIGN PATENT DOCUMENTS

| JP | H11-155031 A | 6/1999 |
| JP | 2007-312336 A | 11/2007 |

* cited by examiner

*Primary Examiner* — King Poon
*Assistant Examiner* — Andrew H Lam
(74) *Attorney, Agent, or Firm* — Burr & Brown, PLLC

(57) ABSTRACT

A facsimile apparatus includes a data receiver, a data transmitter, and a controller. The controller receives facsimile data from another facsimile apparatus through the data receiver, the facsimile data including related information. The controller outputs a screen on which at least one forwarding destination related to the related information of the received facsimile data is displayed in preference to at least one forwarding destination which does not relate to the related information of the received facsimile data. The controller forwards the received facsimile data through the data transmitter to at least one of the at least one forwarding destination designated on the screen.

20 Claims, 10 Drawing Sheets

FIG.3

| ASSOCIATED TABLE 40 |||||
|---|---|---|---|
| COLOR/ MONOCHROME ATTRIBUTE | HIGH/LOW IMAGE-QUALITY ATTRIBUTE | SENDER | ASSOCIATED CLOUD SERVER |
| COLOR | HIGH IMAGE-QUALITY | TELEPHONE NUMBER OF A COMPANY | CLOUD SERVER 1 2 A |
| | | | CLOUD SERVER 1 2 C |
| | | | CLOUD SERVER 1 2 F |
| | | TELEPHONE NUMBER OF B COMPANY | CLOUD SERVER 1 2 B |
| | | TELEPHONE NUMBER OF C COMPANY | CLOUD SERVER 1 2 C |
| | | | CLOUD SERVER 1 2 E |
| | | OTHER TELEPHONE NUMBERS | CLOUD SERVER 1 2 D |
| | LOW IMAGE-QUALITY | ALL TELEPHONE NUMBERS | CLOUD SERVER 1 2 C |
| MONOCHROME | ALL | TELEPHONE NUMBER OF A COMPANY | CLOUD SERVER 1 2 E |
| | | TELEPHONE NUMBER OF B COMPANY | CLOUD SERVER 1 2 A |
| | | | CLOUD SERVER 1 2 B |
| | | OTHER TELEPHONE NUMBERS | CLOUD SERVER 1 2 D |
| | | TELEPHONE NUMBER OF C COMPANY | CLOUD SERVER 1 2 E |
| | | | CLOUD SERVER 1 2 F |
| | | OTHER TELEPHONE NUMBERS | CLOUD SERVER 1 2 D |

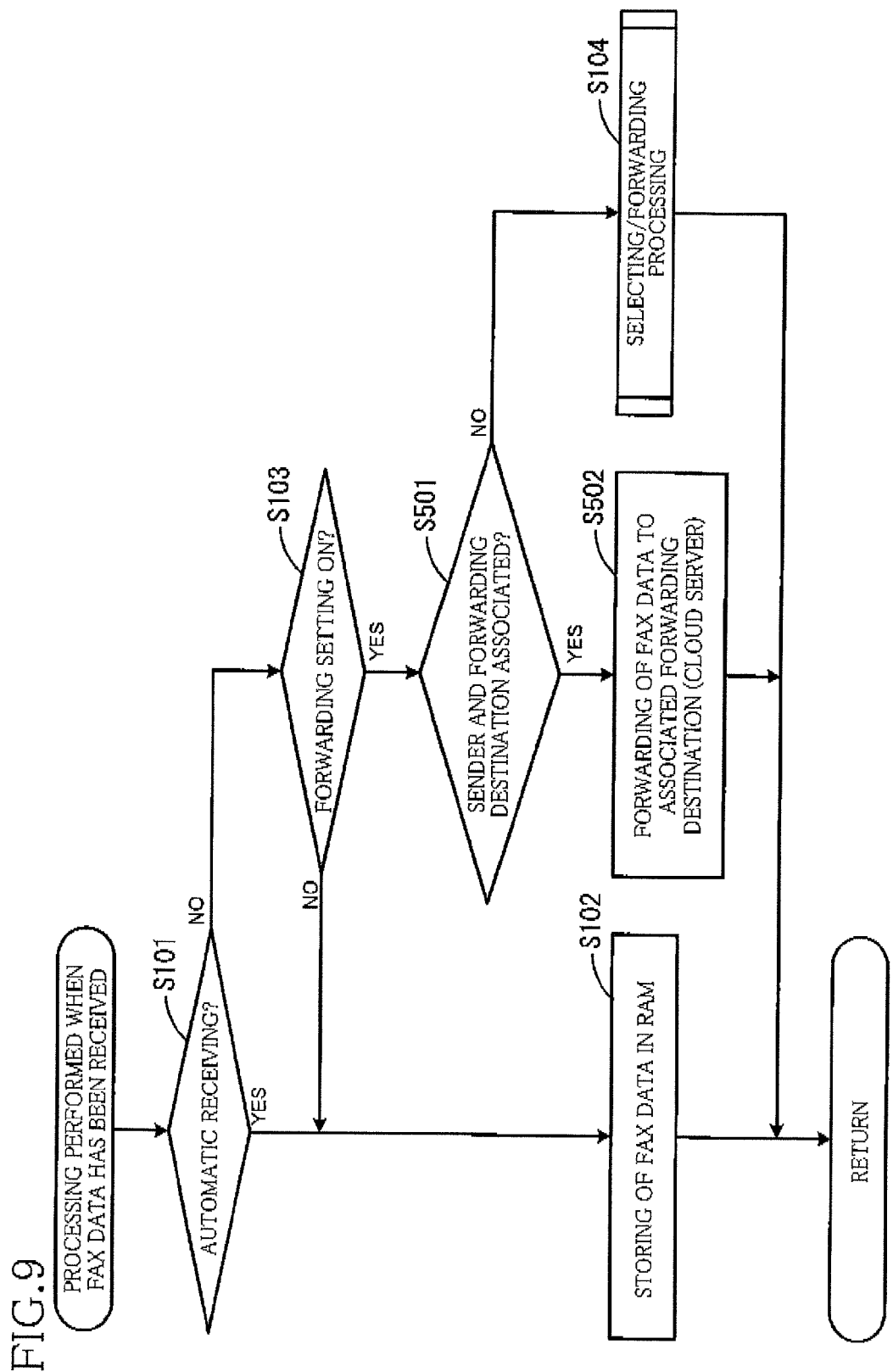

FACSIMILE APPARATUS CAPABLE OF DATA FORWARDING AND DATA FORWARDING METHOD

CROSS REFERENCE TO RELATED APPLICATION

The present application claims priority from Japanese Patent Application No. 2013-201715, which was filed on Sep. 27, 2013, the disclosure of which is herein incorporated by reference to its entirety.

BACKGROUND OF THE INVENTION

1. Field of the Invention

The present invention relates to a technique of forwarding facsimile data of a facsimile apparatus, a data forwarding method and a facsimile-data forwarding system.

2. Description of Related Art

There has been known a facsimile apparatus which displays a list of transmitting destinations of facsimile data so as to receive a selection of the transmitting destination, and which transmits the facsimile data to the selected or designated transmitting destination.

SUMMARY OF THE INVENTION

However, in the above-mentioned conventional technique, since the list of the transmitting destinations is displayed regardless of information related to the facsimile data, there is room for improvement in terms of enhancing convenience for a user to select the transmitting destination. In the above-mentioned conventional technique, the facsimile apparatus receives the selection of the transmitting destination, however, there is also room for improvement for a facsimile apparatus which displays a list of forwarding destinations of the received facsimile data and which receives the selection of the forwarding destination.

It is therefore an object of the present invention to provide a technique for improving the convenience for the user to select a forwarding destination among a plurality of forwarding destinations depending on information related to the received facsimile data.

In order to achieve the above-mentioned object, according to the present invention, there is provided a facsimile apparatus comprising a data receiver, a data transmitter, and a controller, wherein the controller is configured to: receive facsimile data from another facsimile apparatus through the data receiver, the received facsimile data including related information which is information related to the facsimile data; output a screen on which at least one forwarding destination indicator indicating a forwarding destination related to the related information of the received facsimile data is displayed in preference to at least one forwarding destination indicator indicating a forwarding destination which does not relate to the related information of the received facsimile data; and forward the received facsimile data through the data transmitter to at least one forwarding destination designated on the screen.

Further, in order to achieve the above-mentioned object, according to the present invention, there is also provided a data forwarding method of a facsimile apparatus comprising a data receiver and a data transmitter, the method comprising the steps of: receiving facsimile data including related information which is information related to the facsimile data from another facsimile apparatus through the data receiver; outputting a screen on which at least one forwarding destination indicator indicating a forwarding destination related to the related information of the received facsimile data is displayed in preference to at least one forwarding destination indicator indicating a forwarding destination which does not relate to the related information of the received facsimile data; and forwarding the received facsimile data through the data transmitter to at least one forwarding destination designated on the screen.

Further, in order to achieve the above-mentioned object, according to the present invention, there is also provided a facsimile-data forwarding system comprising a facsimile apparatus comprising a data receiver, a data transmitter and a controller, and at least one cloud server which is at least one forwarding destination for the facsimile apparatus, wherein the controller of the facsimile apparatus is configured to: receive facsimile data from another facsimile apparatus through the data receiver, the received facsimile data including related information which is information related to the facsimile data; output a screen on which at least one forwarding destination indicator indicating a forwarding destination related to the related information of the received facsimile data is displayed in preference to at least one forwarding destination indicator indicating a forwarding destination which does not relate to the related information of the received facsimile data; and forward the received facsimile data through the data transmitter to at least one forwarding destination designated on the screen.

BRIEF DESCRIPTION OF THE DRAWINGS

The above and other objects, features, advantages and technical and industrial significance of the present invention will be better understood by reading the following detailed description of preferred embodiments of the invention, when considered in connection with the accompanying drawings, in which:

FIG. 3 is a schematic view showing an associated table;

FIG. 9 is a flow chart showing a processing performed when FAX data has been received in a third embodiment to which the present invention is applied;

DETAILED DESCRIPTION OF THE PREFERRED EMBODIMENTS

First Embodiment

Hereinafter, there will be described a first embodiment of the invention with reference to FIGS. 1 through 7.

(1) Overall Configuration of FAX Receiving/Forwarding System

Figure 1:
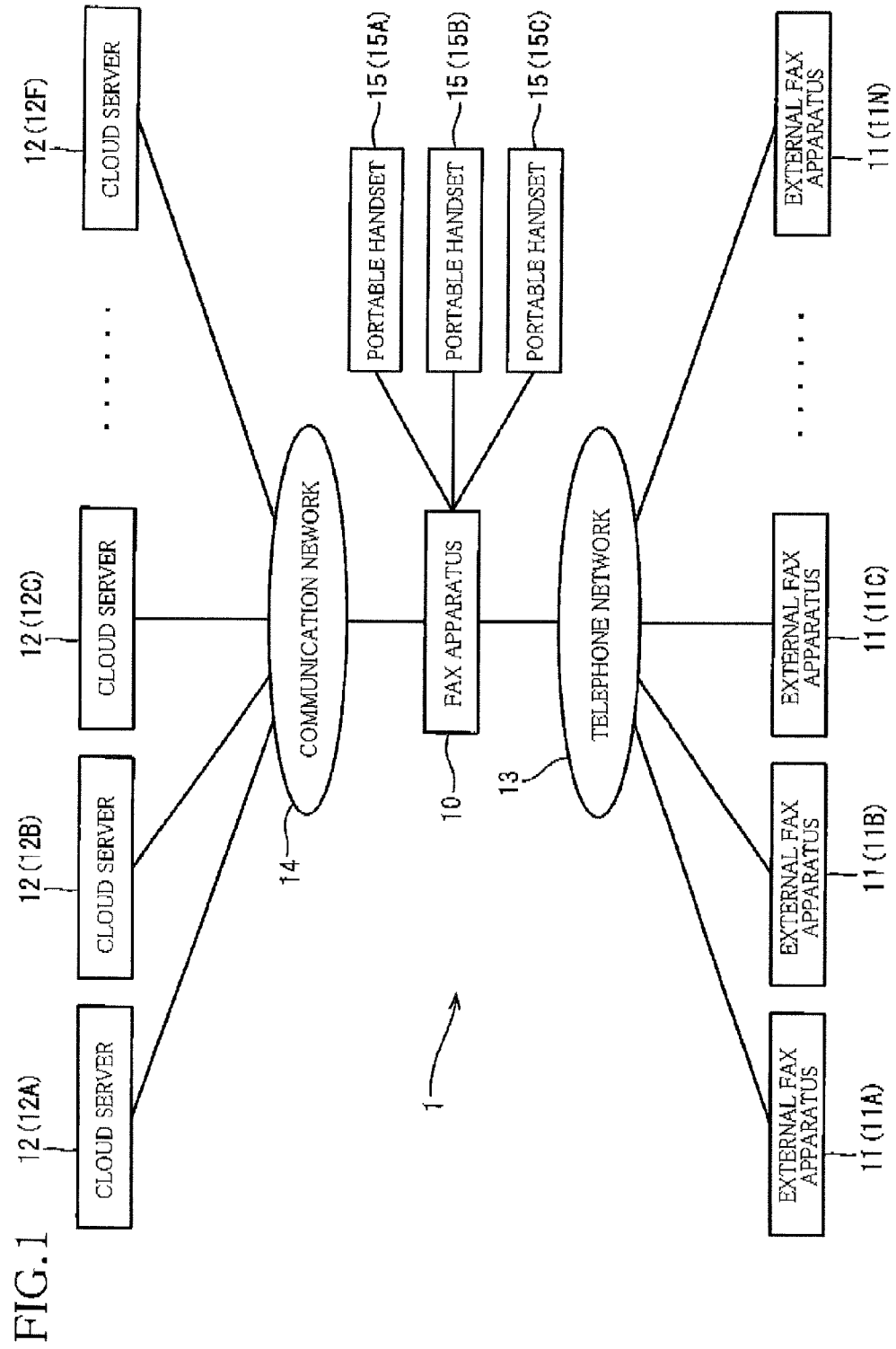
FIG. 1 is a schematic view showing an overall configuration of a FAX receiving/forwarding system as a first embodiment to which the present invention is applied.

Hereinafter, there will be described an overall configuration of a FAX receiving/forwarding system 1 in the first embodiment with reference to FIG. 1. The FAX receiving/forwarding system 1 comprises a FAX apparatus 10, one or more external FAX apparatus 11 (11A through 11N, as examples of another facsimile apparatus), and one or more cloud server(s) 12 (12A through 12F), "FAX" is an abbreviation for facsimile. The FAX apparatus 10 is an example of a facsimile apparatus. Further, each of the cloud servers 12 is an example of a forwarding destination.

The FAX apparatus 10 and the external FAX apparatus 11 are communicably connected to each other through a telephone network 13. Further, the FAX apparatus 10 and the cloud servers 12 are communicably connected to each other through a communication network 14 such as LAN (Local Area Network) and the Internet.

The FAX apparatus 10 is an apparatus for transmitting and receiving FAX data between the external FAX apparatus 11. The FAX apparatus 10 is capable of printing the FAX data that was received from the external FAX apparatus 11 and is capable of forwarding the FAX data that was received from the external FAX apparatus 11.

Further, the FAX apparatus 10 can be used as a telephone. Specifically, there is disposed a receiver for a telephone call in the FAX apparatus 10, and a user can call with the receiver. Furthermore, a so-called portable handset(s) 15 (15A through 15C) of an ordinary telephone machine are wirelessly connected to the FAX apparatus 10, and the user can make a phone call with the portable handset 15.

The cloud server 12 is a server for providing service in which data are stored. The cloud server 12 is managed by, for example, an external service provider. In order to store data in the cloud server 12 and access into data that are stored in the cloud server 12, it is necessary for the user to transmit sign-in information such as a user ID, a password and so on to a service that is previously executed in the cloud server 12 so as to sign in.

The service is a resident program that is executed in the server, and it is called "daemon" in UNIX (registered trademark). The "sign-in" means the same as so-called "login", and it means that the user sends the sign-in information to the service that is executed in the cloud server 12 so as to cause the FAX apparatus 10 to be a state of permission to use of the service.

(2) Electrical Structure of FAX Apparatus

Figure 2:
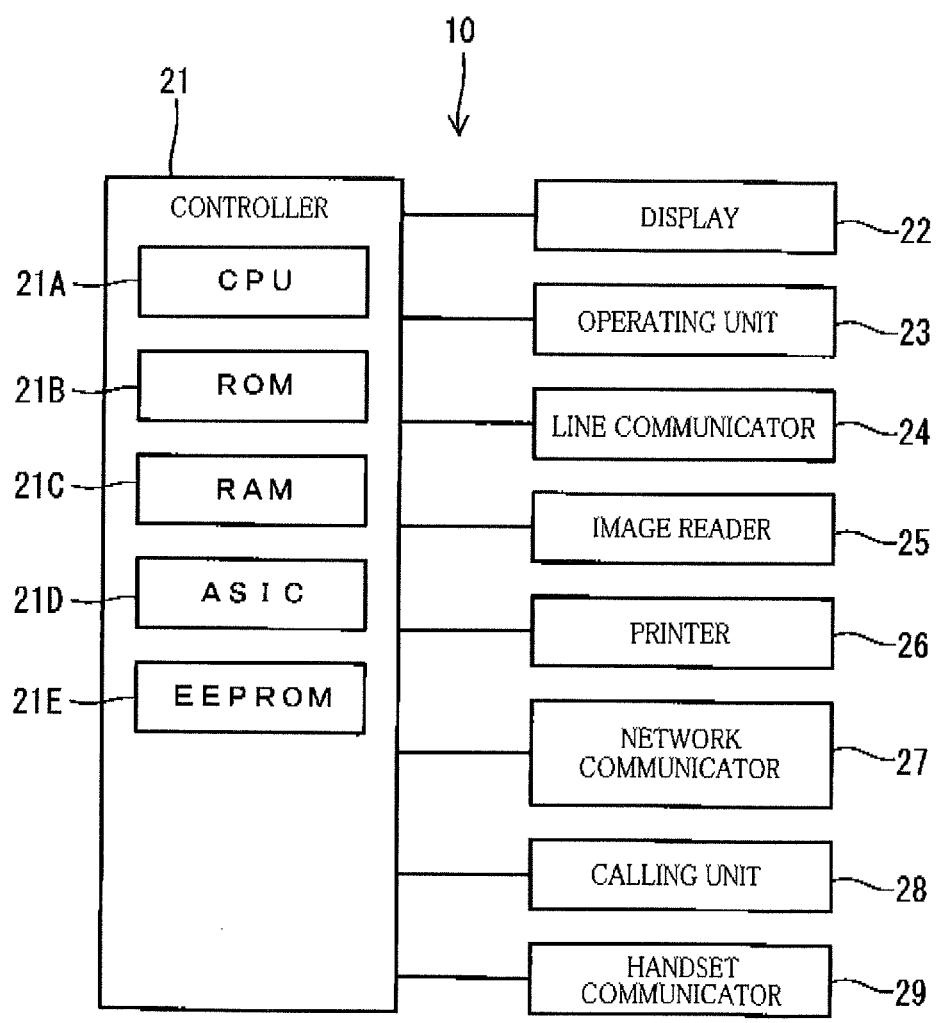
FIG. 2 is a block diagram showing a simplified electrical structure of a FAX apparatus.

Hereinafter, there will be described an electrical structure of the FAX apparatus 10 with reference to FIG. 2. The FAX apparatus 10 comprises a controller 21, a display 22, an operating unit 23, a line communicator 24, an image reader 25, a printer 26, a network communicator 27, a calling unit 28, and a handset communicator 29.

The controller 21 is constituted by a CPU (Central Processing Unit) 21A, a ROM (Read Only Memory) 21B, a RAM (Random Access Memory) 21C, an ASIC (Application Specific Integrated Circuit) 21D, an EEPROM (Electrically Erasable Programmable Read-Only Memory) 21E, and so forth. The CPU 21A controls each of composing elements of the FAX apparatus 10 by executing control programs that are stored in the ROM 21B. The ROM 211 stores the control programs that are executed by the CPU 21A, various data, and so on. The RAM 21C is used as a main storage for the CPU 21A to execute various kinds of processing. The EEPROM 21E is a non-transitory memory for storing various data. In the EEPROM 21E, an associated table 40 (shown in FIG. 3) that will be described later is stored. The EEPROM 21E is an example of a storage.

The display 22 comprises a display device such as a liquid crystal display, a drive circuit for driving the display device, and so on. The operating unit 23 comprises a touch panel which covers the display device, various kinds of operation buttons, and so forth. The user operates the operating unit 23 so as to input various kinds of instructions and information. The operating unit 23 is an example of an operating unit.

The line communicator 24 comprises a NCU (Network Control Unit), a modem, a speaker for ringing an incoming call, a control circuit for controlling the NCU, the modem and the speaker, and so forth. The line communicator 24 transmits and receives the FAX data between the external FAX apparatus 11 through the telephone network 13. The line communicator 24 is also used in a telephone call by the calling unit 28. The line communicator 24 is an example of a data receiver.

The image reader 25 comprises a light source for radiating light to an original document, an image sensor, a light system for forming images on the image sensor with light reflected by the original document, and so on. The image reader 25 reads the original document so as to form image data. The formed image data is transmitted to the external FAX apparatus 11 through the line communicator 24.

The printer 26 prints an image represented by the FAX data that was received through the line communicator 24 on a sheet such as a printing sheet in an electrophotographic manner, an inkjet manner or the like. The network communicator 27 is hardware for connecting the FAX apparatus 10 to the communication network 14. The network communicator 27 is an example of a data transmitter.

The calling unit 28 is for making a phone call with an external telephone. The calling unit 28 comprises a receiver, an off-hook detector, and so on. The off-hook detector is a switch to be mechanically ON/OFF for detecting a so-called off-hook in which the receiver is lifted up such that a line communication is closed and connected, and a so-called on-hook in which the receiver is returned to an original position such that the line communication is cut and disconnected.

The handset communicator 29 is hardware for wirelessly communicating with the portable handset 15. The wireless communication with the portable handset 15 is performed according to, for example, the communication standard called DECT (Digital Enhanced Cordless Telecommunications).

(3) Automatic Receiving of FAX Data and Manual Receiving of FAX Data

The FAX apparatus is capable of receiving the FAX data in two manners. One of the two manners is automatic receiving of the FAX data, and the other is manual receiving of the FAX data.

First, the automatic receiving of the FAX data will be described. When the FAX apparatus 10 receives an incoming call, in a case where the off-hook of the receiver or the handset 15 is not performed during the FAX apparatus 10 rings an incoming call tone for a predetermined number of times, the FAX apparatus 10 automatically performs the off-hook. Then, in a case where the incoming call is a FAX reception, the FAX apparatus 10 receives the FAX data. In other words, in the automatic receiving of the FAX data, the FAX data is received without the user.

Next, the manual receiving of the FAX data will be described. In the manual receiving of the FAX data, the FAX data is received when the FAX apparatus 10 receives a receiving instruction of the FAX data from the user. In the manual receiving of the FAX data, there are manual receiving of the FAX data performed when the FAX reception is received not in the middle of a call, and manual receiving of the FAX data performed when the FAX reception is received in the middle of a call with a user of the external FAX apparatus 11.

First, the manual receiving of the FAX data performed not in the middle of a call will be described. When the user performs the off-hook of the receiver or the handset 15 before the incoming call rings a predetermined number of times, in a case where a sound indicating the FAX reception rings, the user pushes down a FAX button of the operating unit 23 or the handset 15 such that the FAX apparatus 10 comes into a FAX mode, and then pushes down a start button of the FAX reception. The FAX apparatus 10 thus receives the receiving instruction of the FAX data.

Next, the manual receiving of the FAX data performed in the middle of a call with the user of the external FAX apparatus 11 will be described. In a case where the external FAX apparatus is a FAX apparatus having a telephone function and when the user of the FAX apparatus 10 makes a phone call with the user of the external FAX apparatus 11 by using the receiver or the portable handset 15, the manual receiving of the FAX data performed in the middle of a call with the user of the external FAX apparatus 11 is performed.

Specifically, when the user of the FAX apparatus 10 makes a phone call with the user of the external FAX apparatus 11, the user of the FAX apparatus 10 tells the user of the external FAX apparatus 11 of switching to the FAX mode. Then, the user of the FAX apparatus 10 pushes down the FAX button of the operating unit 23 or the handset 15 such that the FAX apparatus 10 becomes in the FAX mode, and pushes down the start button of the FAX reception. Thus, the FAX apparatus 10 receives the receiving instruction of the FAX data.

When the FAX apparatus 10 receives the receiving instruction of the FAX data, the FAX apparatus 10 requires the external FAX apparatus 11 to transmit the FAX data, and the FAX apparatus 10 receives the FAX data from the external FAX apparatus 11. A processing in which the FAX apparatus 10 receives the receiving instruction of the FAX data is an example of an instruction receiving processing.

(4) Forwarding Setting

A forwarding setting is a setting regarding whether the FAX data that was received from the external FAX apparatus 11 is forwarded to the cloud server 12. In a case where the user of the FAX apparatus 10 wants the received FAX data from the external FAX apparatus 11 to be forwarded to the cloud server 12, the user of the FAX apparatus 10 previously operates the operating unit 23 to set the forwarding setting to be ON. On the other hand, in a case where the user of the FAX apparatus 10 wants the received FAX data from the external FAX apparatus 11 not to be forwarded to the cloud server 12, the user of the FAX apparatus 10 operates the operating unit 23 to set the forwarding setting to be OFF. A processing in which the CPU 21A receives the forwarding setting from the user is an example of a setting processing.

In a case where the forwarding setting is ON, when the FAX apparatus 10 receives the FAX data, the FAX apparatus 10 causes the display 22 of the FAX apparatus 10 or a display which the handset 15 comprises to display a selection screen 50 (illustrated in FIG. 4) that will be described later so as to receive a selection of the cloud server 12 as a forwarding destination by the user. Then, the FAX apparatus 10 forwards the FAX data to the cloud server 12 that was selected or designated by the user.

In a case where the forwarding setting is OFF, when the FAX apparatus 10 receives the FAX data, the FAX apparatus 10 does not display the selection screen and causes the RAM 21C to store the received FAX data. The printer 26 prints the FAX data stored in the RAM 21C later when the user instructs printing.

In the present embodiment, in a case where the FAX data is received by the automatic receiving, the FAX data is not automatically forwarded even if the forwarding setting is ON. The reason for this will be described later. In a case where the FAX data is not forwarded, the FAX apparatus 10 causes the RAM 21C to store the FAX data.

(5) Selection of Cloud Server as Forwarding Destination

As described above, when the FAX apparatus 10 receives the FAX data by the manual receiving, in the case where the forwarding setting is ON, the FAX apparatus 10 causes the display 22 of the FAX apparatus 10 or the display of the portable handset 15 to display the selection screen 50 (illustrated in FIG. 4) so as to receive the user's selection of the cloud server 12 as the forwarding destination. In this display, the FAX apparatus 10 displays the selection screen 50 on which at least one cloud server 12 that is associated with information related to the received FAX data is displayed in preference to at least one cloud server 12 that is not associated with the information. Hereinafter, this will be more specifically described.

(5-1) Information Related to FAX Data

First, information related to the FAX data will be described. Specifically, the information related to the FAX data is information indicating the attribute of the FAX data, information indicating a sender of the FAX data, and so on. The attribute of the FAX data includes color/monochrome attribute, high/low image-quality attribute, and so forth.

The color/monochrome attribute is information indicating that the FAX data includes color images or monochrome images. Here, the monochrome attribute is constituted by only white, black and gray, that is, neutral colors. Further, the color attribute indicates colors except the neutral colors, that is, chromatic colors. The color/monochrome attribute is an example of information indicating whether images represented by the FAX data are in chromatic colors.

The color/monochrome attribute is transmitted from the external FAX apparatus 11. Specifically, when the FAX apparatus 10 receives the FAX data from the external FAX apparatus 11, the FAX apparatus 10 negotiates with the external FAX apparatus 11. In this negotiation, the FAX apparatus 10 transmits an ability of the FAX apparatus 10 to the external FAX apparatus 11, and the external FAX apparatus 11 transmits the color/monochrome attribute to the FAX apparatus 10 depending on the received ability of the FAX apparatus 10.

For example, in a case where the FAX data that is subject to be transmitted has the color attribute, the external FAX apparatus 11 judges whether the FAX apparatus 10 can handle the color attribute based on the above-described ability of the FAX apparatus 10. When the FAX apparatus 10 can handle the color attribute, the FAX apparatus 11 transmits information indicating the color attribute as the color/monochrome attribute to the FAX apparatus 10.

The high/low image-quality is information indicating whether the FAX data indicates a high quality of image or a low quality of image. The high/low image-quality attribute is an example of information indicating a quality of image represented by the FAX data. The high/low image-quality attribute is also transmitted in the above-described negotiation from the external FAX apparatus 11. When the high/low image-quality attribute is transmitted, the external FAX apparatus 11 also transmits the high/low image-quality attribute to the FAX apparatus 10 depending on the ability of the FAX apparatus 10.

A processing in which the FAX apparatus 10 sends its ability to the external FAX apparatus 11 is an example of an ability transmitting processing. A processing in which the FAX apparatus 10 receives the information related to the FAX data from the external FAX apparatus 11 is an example of a related-information receiving processing.

The information indicating a sender of the FAX data means a telephone number of the external FAX apparatus 11 which transmitted the FAX data to the FAX apparatus 10. The telephone number of the external FAX apparatus 11 is transmitted from the external FAX apparatus 11 to the FAX apparatus 10. The telephone number of the external FAX apparatus 11 is an example of identification information for identifying a sender. Further, a processing in which the FAX apparatus 10 receives the telephone number from the external FAX apparatus 11 is an example of an identification receiving processing.

(5-2) Association Between Information Related to FAX Data and Cloud Server

Next, the association between the information related to the FAX data and the cloud server will be described. In a case where there are a plurality of cloud servers 12, the user may select one of the cloud servers 12 as the forwarding destination depending on the information related to the received FAX data. For example, there is such a case that, when the FAX data has the color attribute, the user wants to forward the FAX data to the cloud server 12A, and when the FAX data has the monochrome attribute, the user wants to forward the FAX data to the cloud server 12B. Further, there is such a case that, when the sender is the X company, the user wants to forward the FAX data to the cloud server 12B, and when the sender is the Y company, the user wants to forward the FAX data to the cloud server 12D.

Therefore, in the present embodiment, an associated relationship between the information related to the FAX data and the cloud server 12 can be previously registered in the associated table 40 illustrated in FIG. 3. The associated table 40 is stored in the EEPROM 21E of the FAX apparatus 10. The associated relationship between the information related to the FAX data and the cloud server 12 can be registered by the user's operation of the operating unit 23.

In examples illustrated in FIG. 3, for example, in a case where the color/monochrome attribute of the received FAX data is the color attribute, the high/low image-quality attribute thereof is the high image-quality attribute, and the sender of the received FAX data is the A company, the case is associated with the cloud servers 12A, 12C, and 12F as the forwarding destinations.

Further, in a case where the color/monochrome attribute of the received FAX data is the color attribute, the high/low image-quality attribute thereof is the high image-quality, and the sender of the received FAX data is a company other than the A company, the B company and the C company, the case is associated with the cloud server 12D.

(5-3) Selection Screen

Hereinafter, the selection screen 50 will be described with reference to FIG. 4. On the selection screen 50, the cloud servers 12 that are associated with the information related to the FAX data are displayed, but the cloud servers 12 that are not associated with the information related to the FAX data are not displayed. The selection screen 50 is an example of a screen on which at least one forwarding destination indicator each indicating a forwarding destination which is associated with information related to the received FAX data is displayed in preference to at least one forwarding destination indicator each indicating a forwarding destination which is not associated with information related to the received FAX data.

For example, there is a case in which the color/monochrome attribute is the color attribute, the high/low image-quality attribute is the high image-quality attribute, and a telephone number of the sender is the telephone number of the A company. In this case, according to the associated table 40 illustrated in FIG. 3, the cloud servers 12 that are associated with the information related to the FAX data are the cloud servers 12A, 12C and 12F, and the cloud servers 12 that are not associated with the information related to the FAX data are the cloud servers 12B, 12D and 12E.

Figure 4:
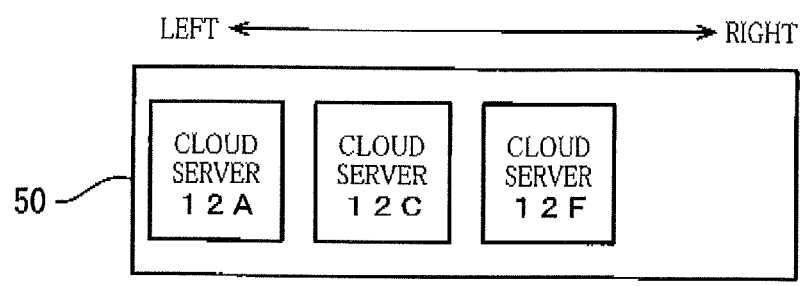
FIG. 4 is a schematic view showing a selection screen.
Figure 5:
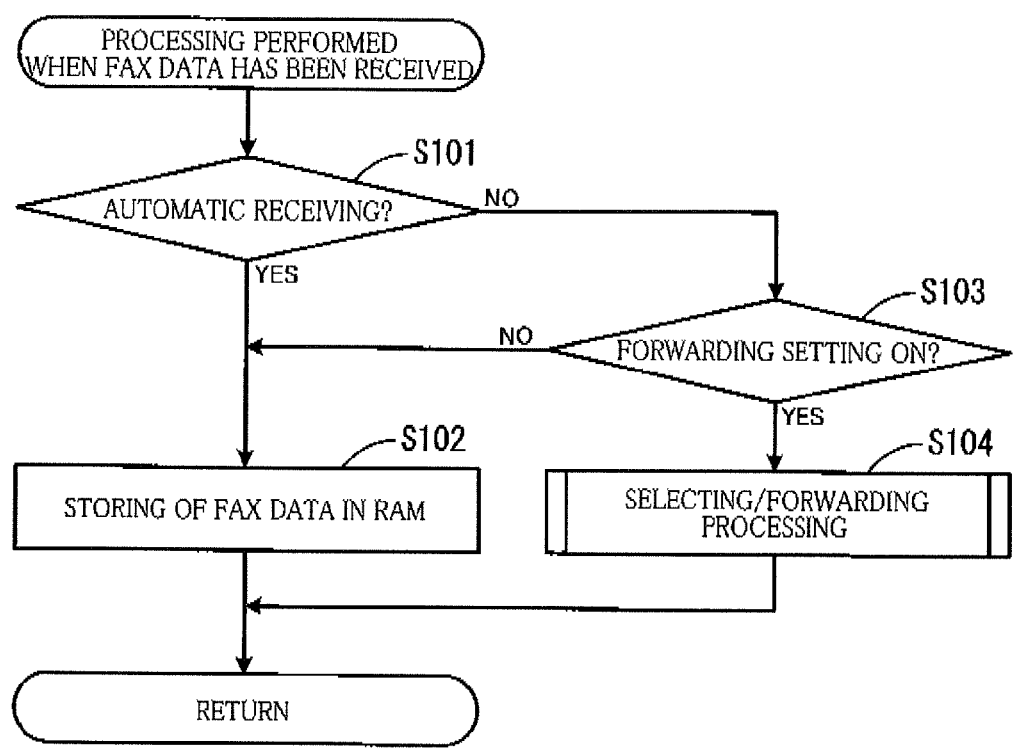
FIG. 5 is a flow chart showing a processing performed when FAX data has been received.

In this case, as illustrated in FIG. 4, while the FAX apparatus 10 displays the cloud servers 12A, 12C and 12F on the selection screen 50, the FAX apparatus 10 does not display the cloud servers 12B, 12D and 12E on the selection screen 50

(5-4) Sign-in Information

As described before, in order to cause the cloud servers 12 to store data, and in order to access to data that is stored in the cloud servers 12, it is necessary for the user to sign in to the cloud servers 12. Therefore, the sign-in information of each of at least one of the cloud servers 12 is stored in the EEPROM 21E. However, the sign-in information of all the cloud servers 12 that are registered in the associated table 40 are not necessarily stored in the EEPROM 21E.

Since the FAX data cannot be forwarded to the cloud server 12 whose sign-in information is not stored in the EEPROM 21E, it is possible that the user is confused when the cloud server 12 whose sign-in information is not stored in the EEPROM 21E is also displayed on the selection screen 50. Accordingly, the FAX apparatus 10 does not display on the selection screen 50 the cloud server 12 whose sign-in information is not stored in the EEPROM 21E, even if the said cloud server 12 is associated with the information related to the received FAX data.

On the selection screen 50 illustrated in FIG. 4, the cloud servers 12A, 12C and 12F are displayed, but in a case where the sign-in information about the cloud server 12F is not stored in the EEPROM 21E, the cloud server 12F is not displayed on the selection screen 50.

There may be a case where the sign-in information is unnecessary depending on the cloud server 12. In this case, the cloud server 12 is displayed on the selection screen 50 even if the sign-in information of the said cloud server 12 is not stored in the EEPROM 21E.

(6) Exception of Forwarding of FAX Data

As described before, when the FAX apparatus 10 received the FAX data by the automatic receiving, the FAX apparatus 10 does not forward the FAX data even if the forwarding setting is ON, and causes the RAM 21C to store the FAX data. Hereinafter, the reason for this will be explained.

The reason why the FAX data is not forwarded in a case of the automatic receiving is that, in the automatic receiving, when the FAX apparatus 10 receives the FAX data, the user does not always operate the operating unit 23 or the portable handset 15. When the user does not operate the FAX apparatus 10 or the portable handset 15, even if the selection screen 50 is displayed, the forwarding destination is not selected or designated, so that the FAX apparatus 10 does not forward the received FAX data and stores the FAX data in the RAM 21C.

On the other hand, the reason why the FAX data is forwarded in a case of the manual receiving is that, in the manual receiving, when the FAX apparatus 10 receives the FAX data, the user is operating the operating unit 23 or the portable handset 15, so that the user can select the cloud server 12 as the forwarding destination.

(7) Processing Performed when FAX Apparatus 10 Received FAX Data

Hereinafter, a processing performed when the FAX apparatus 10 received the FAX data will be described. The processing starts when the FAX apparatus 10 received the FAX data. As described before, there are three cases in which the FAX apparatus 10 receives the FAX data by the automatic receiving, by the manual receiving performed when the FAX data arrived, and by the manual receiving in the middle of a call between the user of the FAX apparatus 10 and the user of the external FAX apparatus 11. The processing is executed in any of the cases.

In step S101 (hereinafter, "step" will be omitted), the CPU 21A judges whether the FAX data has been received by the automatic receiving. When the FAX data has been automatically received (S101: Yes), the processing goes to S102. On the other hand, when the FAX data has been received in a manner except the automatic receiving (S101: No), the processing goes to S103. In S102, the CPU 21A stores the received FAX data in the RAM 21C.

In S103, the CPU 21A judges whether the forwarding setting is ON. When the forwarding setting is ON (S103: Yes), the processing goes to S104, and when the forwarding setting is not ON, i.e., the forwarding setting is OFF (S103: No), the processing goes to S102. In S104, the CPU 21A executes a selecting/forwarding processing. The selecting/forwarding processing is a processing in which the selection screen 50 is displayed so as to receive the user's selection of the cloud server 12 as the forwarding destination, and then, the FAX data is forwarded to the cloud server 12 that is selected or designated by the user. The selecting/forwarding processing will be detailed later.

(7-1) Selecting/Forwarding Processing

Figure 6:
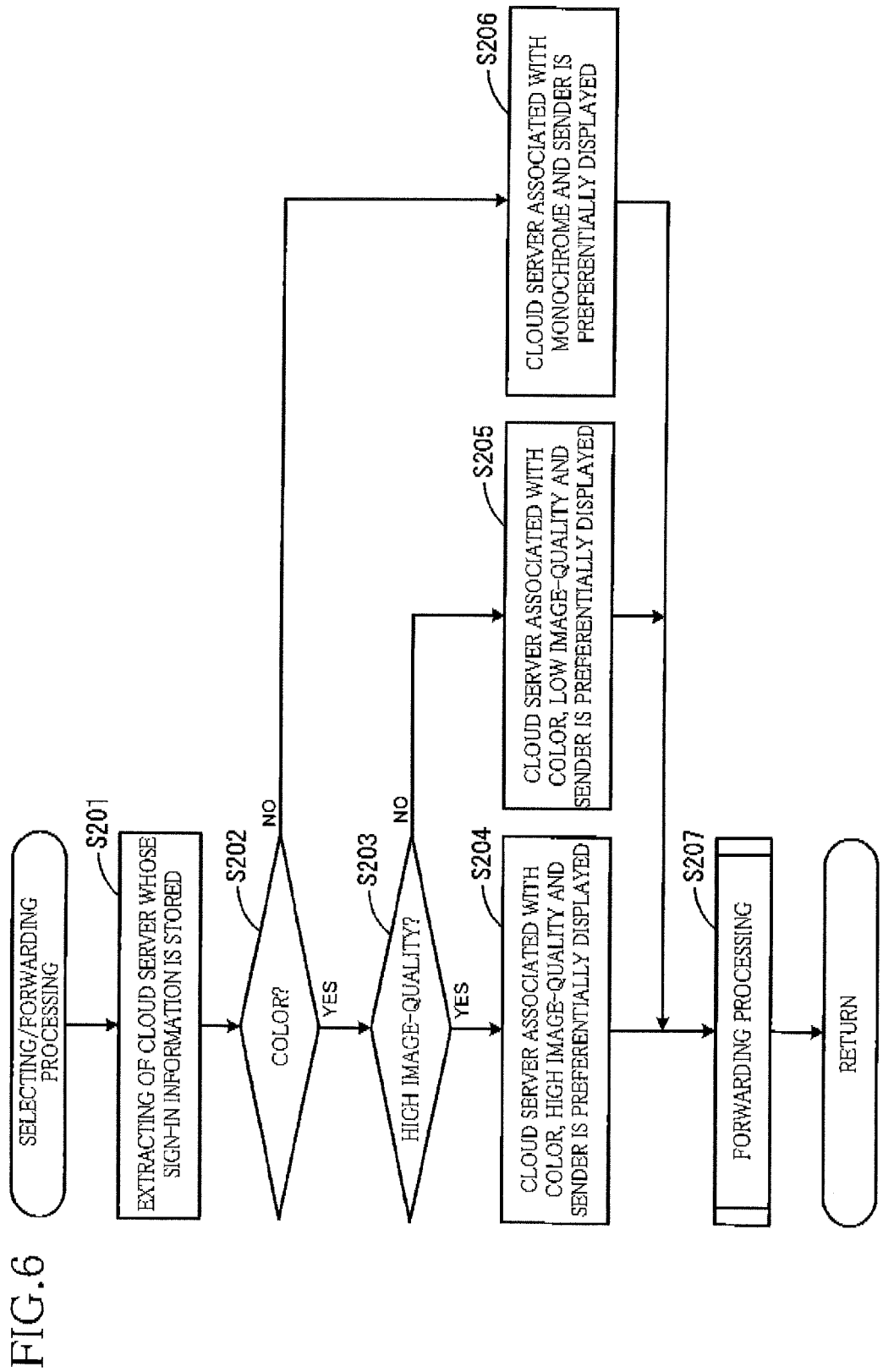
FIG. 6 is a flow chart showing a receiving/forwarding processing.

Hereinafter, the selecting/forwarding processing that is executed in S104 will be described with reference to FIG. 6. In S201, the CPU 21A extracts at least one cloud server 12, the sign-in information of which is stored in the EEROM 21E from the cloud servers 12 that are registered in the associated table 40.

In S202, the CPU 21A judges whether the color/monochrome attribute of the received FAX data is the color attribute or the monochrome attribute. When the color/monochrome attribute of the FAX data is the color attribute (S202: Yes), the processing goes to S203. When the color/monochrome attribute of the FAX data is the monochrome attribute (S202: No), the processing goes to S206. In S203, the CPU 21A judges whether the high/low image-quality attribute of the received FAX data is the high image-quality attribute or the low image-quality attribute. When the high/low image-quality attribute of the received FAX data is the high image-quality attribute (S203: Yes), the processing goes to S204. When the high/low image-quality attribute of the received FAX data is the low image-quality attribute (S203: No), the processing goes to S205.

In S204, the CPU 21A causes the FAX apparatus 10 or the portable handset 15 to display the selection screen 50. More specifically, when the operating unit 23 of the FAX apparatus 10 has received the receiving instruction, the CPU 21A causes the display 22 of the FAX apparatus 10 to display the selection screen 50. When the portable handset 15 has received the receiving instruction, the CPU 21A causes the display of the portable handset 15 to display the selection screen 50. Then, the CPU 21A causes the selection screen 50 to display at least one cloud server 12, each of which is associated with the color attribute, the high image-quality attribute and the sender of the received FAX data, among the at least one cloud server 12 that was extracted in S201. S204 is an example of an outputting processing.

In S205, the CPU 21A causes the FAX apparatus 10 or the portable handset 15 to display the selection screen 50, similarly in S204. Then, the CPU 21A causes the selection screen 50 to display at least one cloud server 12, each of which is associated with the color attribute, the low image-quality attribute and the sender of the received FAX data, among the at least one cloud server 12 that was extracted in S201. S205 is an example of an outputting processing.

In S206, the CPU 21A causes the FAX apparatus 10 or the portable handset 15 to display the selection screen 50, similarly in S204. Then, the CPU 21A causes the selection screen 50 to display at least one cloud server 12, each of which is associated with the monochrome attribute and the sender of the received FAX data, among the at least one cloud server 12 that was extracted in S201. S206 is an example of an outputting processing.

In S207, the CPU 21 executes a forwarding processing. The forwarding processing is a processing in which the FAX data is forwarded to the cloud server 12 that was selected or designated. The forwarding processing will be detailed later.

(7-2) Forwarding Processing

Hereinafter, the forwarding processing that is executed in S207 will be described with reference to FIG. 7. In S301, the CPU 21A judges whether a predetermined period of time has passed since the selection screen 50 was displayed. When the predetermined time has passed (S301: Yes), the processing goes to S302. When the predetermined time has not passed (S301: No), the processing goes to S303.

In S302, the CPU 21A forwards the FAX data to a predetermined cloud server 12. The predetermined cloud server 12 is determined by the user's operation of the operating unit 23. In S303, the CPU 21A judges whether the cloud server 12 has been selected or designated by the user on the selection screen 50. When the cloud server 12 has been selected (S303: Yes), the processing goes to S304. When the cloud server 12 has not been selected (S303: No), the processing returns to S301 and is repeatedly executed.

In S304, the CPU 21A transmits the sign-in information to the selected cloud server 12 by using the network communicator 27. After the CPU 21A succeeded in the sign-in to the selected cloud server 12, in S305, the CPU 21A transmits the received FAX data to the cloud server 12 by using the network communicator 27. S305 is an example of a forwarding processing.

(8) Effects of Embodiment

The above-described FAX apparatus 10 causes the selection screen 50 to display at least one cloud server 12 that is associated with the information related to the received FAX data, in preference to the at least one cloud servers 12 that is not associated with the information related to the received FAX data. Therefore, in the FAX apparatus 10, compared to a case where all of the cloud servers 12 are displayed regardless of the content of the information related to the FAX data, the convenience for the user is increased when the user selects, among the plurality of cloud servers 12, the cloud servers 12 that are associated with the information related to the received FAX data.

Further, in the FAX apparatus 10, when the information indicates the color attribute of the color/monochrome attribute, the cloud servers 12 that are associated with the information indicating the color attribute are preferentially displayed, so that the convenience for the user is enhanced when the user selects the cloud servers 12 that are associated with the information indicating the color attribute. Furthermore, in the FAX apparatus 10, when the information indicates the monochrome attribute of the color/monochrome attribute, the cloud servers 12 that are associated with the information indicating the monochrome attribute are preferentially displayed, so that the convenience for the user is enhanced when the user selects the cloud servers 12 that are associated with the information indicating the monochrome attribute.

Further, in the FAX apparatus 10, when the information indicates the high image-quality attribute of the high/low image-quality attribute, the cloud servers 12 that are associated with the information indicating the high image-quality attribute are preferentially displayed, so that the convenience for the user is enhanced when the user selects the cloud servers 12 that are associated with the information indicating the high image-quality attribute. Furthermore, in the FAX apparatus 10, when the information indicates the low image-quality attribute of the high/low image-quality attribute, the cloud servers 12 that are associated with the information indicating the low image-quality attribute are preferentially displayed, so that the convenience for the user is enhanced when the user selects the cloud servers 12 that are associated with the information indicating the low image-quality attribute.

Further, in the FAX apparatus 10, while the cloud servers 12 that are associated with the information related to the FAX data are displayed, the cloud servers 12 that are not associated with the information related to the FAX data are not displayed, so that the cloud servers 12 that are associated with the information related to the received FAX data can be displayed in preference to the cloud servers 12 that are not associated with the said information.

Moreover, in the FAX apparatus 10, each of the cloud servers 12 whose sign-in information is not stored in the EEPROM 21E is not displayed on the selection screen 50, so that it can prevent the cloud servers 12 to which the FAX data are unable to be forwarded from being displayed on the selection screen 50.

Furthermore, in the FAX apparatus 10, since the selection screen 50 is not outputted when the forwarding setting is OFF, it can be restrained that the selection screen 50 is unnecessarily outputted.

Further, in the FAX apparatus 10, when the FAX apparatus 10 has received the receiving instruction of the manual receiving of the FAX data by using the operating unit 23, the FAX apparatus 10 causes the display 22 of the FAX apparatus 10 to output the selection screen 50. In a case where the user performs the receiving instruction with the operating unit 23 of the FAX apparatus 10, when the FAX apparatus 10 has received the receiving instruction, it is highly likely that the user is near the FAX apparatus 10. Therefore, when the operating unit 23 has received the receiving instruction, the selection screen 50 is displayed on the display 22 of the FAX apparatus 10, so that the user who performed the receiving instruction can select the cloud server 12 at the place where the user performed the receiving instruction. Accordingly, the convenience for the user who performed the receiving instruction is improved, compared to a case where the selection screen 50 is outputted to an apparatus except the FAX apparatus 10.

Furthermore, the FAX apparatus 10 notifies the ability of the FAX apparatus 10 to the sender of the FAX data, in the negotiation between the FAX apparatus 10 and the external FAX apparatus 11, and then, the FAX apparatus 10 receives the information related to the FAX data, so that the selection screen 50 can be displayed based on the information related to the FAX data depending on the ability of the FAX apparatus 10.

Furthermore, the FAX apparatus 10 receives a telephone number from the external FAX apparatus 11, so that the FAX apparatus 10 can identify the sender of the FAX data.

Second Embodiment

Figure 8:
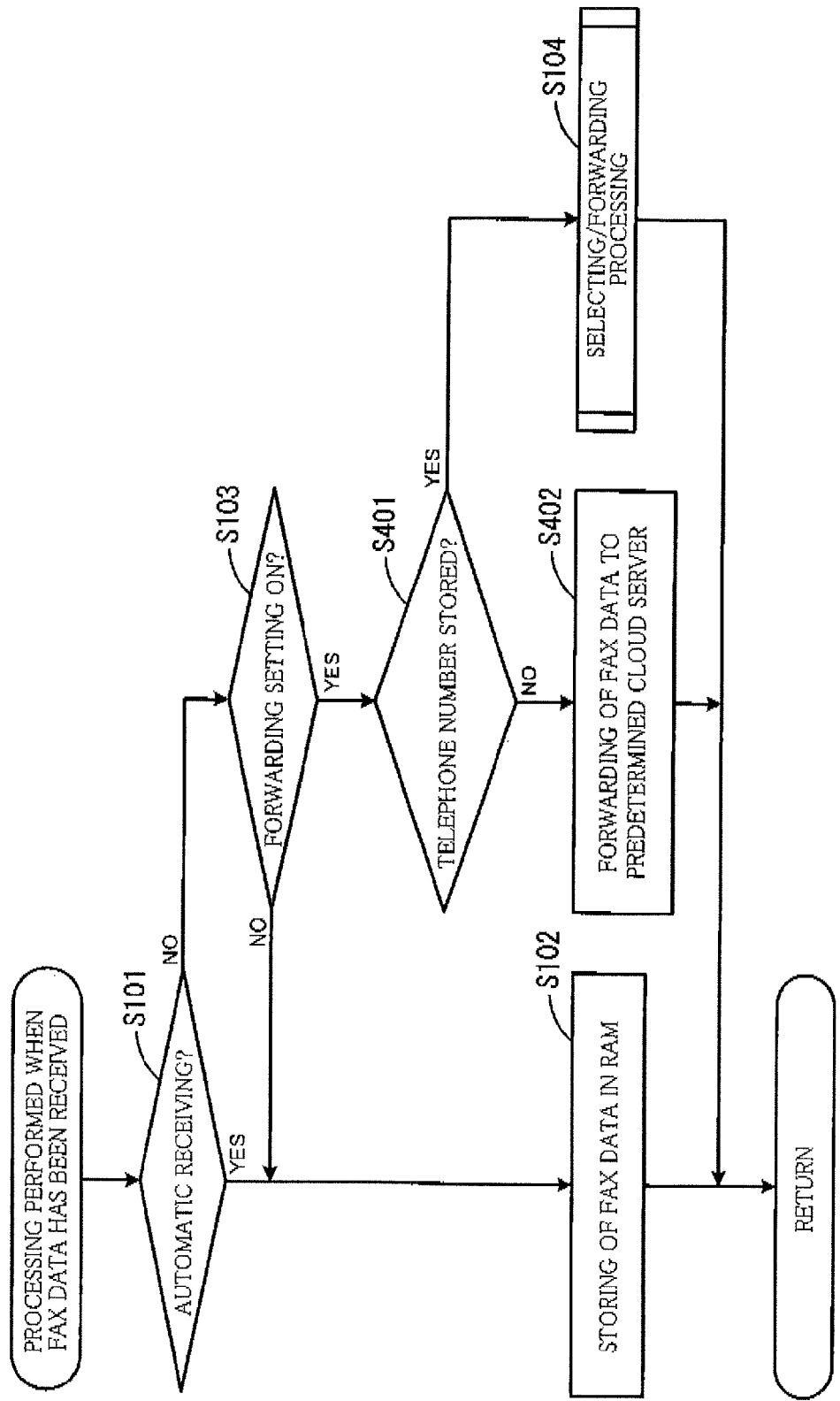
FIG. 8 is a flow chart showing a processing performed when FAX data has been received in a second embodiment to which the present invention is applied.

Hereinafter, the second embodiment will be described with reference to FIG. 8. In the first embodiment, when the FAX data was received by the manual receiving, in the case where the forwarding setting is ON, the selection screen 50 for selecting the cloud server 12 as the forwarding destination is displayed. On the other hand, in the second embodiment, the telephone numbers are previously stored in the EEPROM 21E of the FAX apparatus 10. In the FAX apparatus 10 in the second embodiment, when the telephone number of the sender of the received FAX data is stored in the EEPROM 21E, the selection screen 50 is displayed. On the other hand, when the telephone number of the sender of the received FAX data is not stored in the EEPROM 21E, the FAX data is forwarded to the predetermined cloud server 12.

Each of the senders whose telephone number is stored in the EEPROM 21E is an example of a sender that executes an outputting processing. Further, each of the telephone numbers is an example of judgment information.

A processing performed when the FAX data has been received in the second embodiment will be described with reference to FIG. 8. In the second embodiment, the substantially identical processing used in the first embodiment will be denoted by the reference numerals used in the first embodiment, and description thereof is omitted.

In S401, the CPU 21A judges whether the telephone number of the sender of the received FAX data is stored in the EEPROM 21E. When the telephone number of the sender is not stored (S401: No), the processing goes to S402. When the telephone number of the sender is stored (S401: Yes), the processing goes to S104. S401 is an example of a judging processing.

In the above-described FAX apparatus 10, whether the selection screen 50 is outputted or not can be differentiated depending on the sender of the FAX data. For example, in a case where the received FAX data is transmitted from the specific sender who always performs receiving and transmitting of the FAX data, the selection screen 50 is displayed for the user to select the forwarding destination. On the other hand, in a case where the received FAX data is transmitted from the other senders, the FAX data may be forwarded to the predetermined cloud server 12.

In the FAX apparatus 10 in the second embodiment, the telephone number of the specific sender is stored in the EEPROM 21E, so that, only when the sender of the FAX data is the specific sender, the selection screen 50 is displayed for the user to select the forwarding destination. Accordingly, the convenience for the user who wants to select the forwarding destination only when the sender of the FAX data is the specific sender can be improved.

Third Embodiment

Hereinafter, the third embodiment will be described with reference to FIG. 9. In the first embodiment described above, when the FAX data was received by the manual receiving, in the case where the forwarding setting is ON, the selection screen 50 for selecting the cloud server 12 as the forwarding destination is displayed. In the FAX apparatus 10 in the third embodiment, the telephone number and the forwarding destination that are associated with each other are previously stored in the EEPROM 21E. When the telephone number of the sender of the received FAX data is stored in the EEPROM 21E, the FAX apparatus 10 in the third embodiment does not display the selection screen 50 and forward the FAX data to the forwarding destination that is associated with the telephone number of the sender. On the other hand, when the telephone number of the sender of the received FAX data is not stored in the EEPROM 21E, the FAX apparatus 10 displays the selection screen 50.

A processing performed when the FAX data has been received in the third embodiment will be described with reference to FIG. 9. In the third embodiment, the substantially identical processing used in the first embodiment will be denoted by the reference numerals used in the first embodiment, and description thereof is omitted.

In S501, the CPU 21A judges whether the sender of the FAX data is associated with the forwarding destination. Specifically, the CPU 21A judges whether the telephone number of the sender of the FAX data is stored in the EEPROM 21E. When the sender of the FAX data is associated with the forwarding destination (S501: Yes), the CPU 21A goes to S502. When the sender of the FAX data is not associated with the forwarding destination (S501: No), the CPU 21A goes to S104. In S502, the CPU 21A forwards the FAX data to the cloud server 12 that is associated with the sender of the FAX data.

In the FAX apparatus 10 in the third embodiment, when the sender of the FAX data is associated with the cloud server 12 as the forwarding destination, the selection screen 50 is not displayed. When the sender of the FAX data is associated with the cloud server 12, the FAX data is forwarded to the cloud server 12 that is associated with the sender of the FAX data, so that it is unnecessary for the selection screen 50 to be displayed. In the FAX apparatus 10 in the third embodiment, since the selection screen 50 is not displayed when the sender of the FAX data is associated with the cloud server 12, unnecessary displaying of the selection screen 50 can be restrained, compared to a case where the selection screen 50 is displayed even when the sender of the FAX data is associated with the cloud server 12.

Fourth Embodiment

Hereinafter, the fourth embodiment will be described with reference to FIGS. 10A through 10C. In the fourth embodiment, other examples of a selection screen will be described.

Figure 10A:
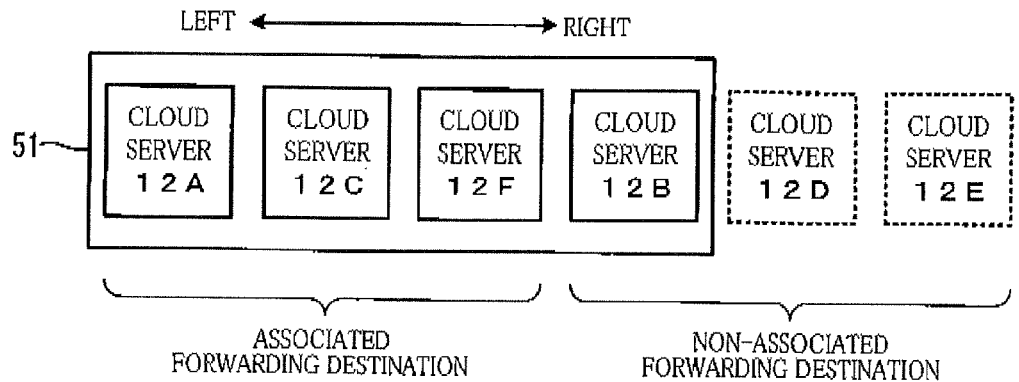
FIG. 10A is a schematic view of one selection screen in a fourth embodiment to which the present invention is applied.

The selection screen 51 shown in FIG. 10A is a selection screen on which the cloud servers 12 that are associated with the information related to the FAX data are displayed at a left side of the cloud servers 12 that are not associated with the information related to the FAX data. The selection screen 51 is an example of a screen on which a forwarding destination which is associated with information related to FAX data is displayed in preference to the forwarding destination that is not associated with the information.

Right after the selection screen 51 starts to be displayed, as illustrated in FIG. 10A, the cloud server 12(A) that is displayed at the foremost in a displaying order of the cloud servers 12 is displayed at the leftmost side of a displaying area. In a case where there are too many cloud servers 12 to display all of the cloud servers 12 together on the selection screen 51, the selection screen 51 is scrolled in the left direction such that the cloud servers 12 that are not displayed on the selection screen 51 and are positioned at the right side of the displaying area can be displayed. In FIG. 10A, the cloud servers 12(D, E) that are not displayed on the selection screen 51 are indicated by a broken line.

It is highly possible that the cloud servers 12 positioned at the left side are displayed without scrolling or with a small scrolling, compared to the cloud servers 12 positioned at the right side, so that, the more the cloud server 12 is positioned at left side, the smaller the load of the user for scrolling when the cloud server 12 that is associated with the information related to the received FAX data is selected becomes. Therefore, the selection screen 51 enhances the convenience for the user to select one of the plurality of cloud servers 12 which is associated with the information related to the received FAX data, compared to a case where the cloud servers 12 are displayed regardless of the content of the information related to the FAX data.

Figure 10B:
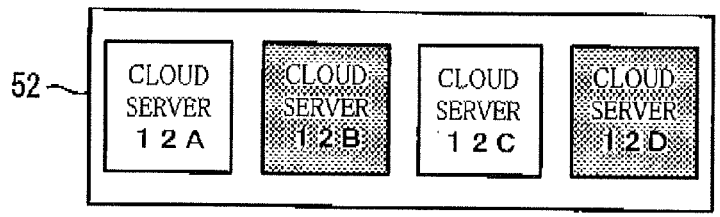
FIG. 10B is a schematic view of another selection screen in the fourth embodiment.

The selection screen 52 illustrated in FIG. 10B is a selection screen on which the cloud servers 12 that are associated with the information related to the FAX data are normally displayed, and the cloud servers 12 that are not associated with the information related to the FAX data are displayed in gray-out. While the cloud servers 12 that are normally displayed can be selected, the cloud servers 12 that are displayed in gray-out cannot be selected. The selection screen 52 is an example of it selection screen on which it is displayed such that whether the cloud server 12 is the forwarding destination that is associated with the information related to the FAX data can be identified.

Figure 10C:
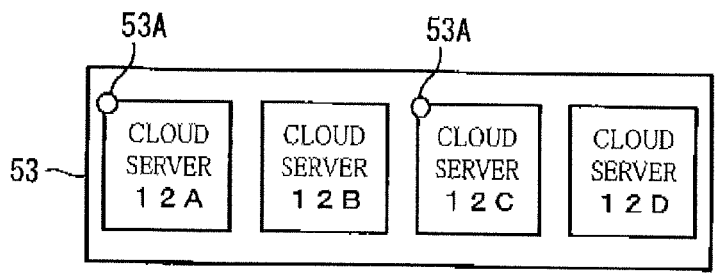
FIG. 10C is a schematic view of another selection screen in the fourth embodiment.

The selection screen 53 illustrated in FIG. 10C is a selection screen on which, a mark 53A is displayed on each of the cloud servers 12 that is associated with the information related to the FAX data, and the mark 53A is not displayed on each of the cloud servers 12 that is not associated with the information related to the FAX data. The selection screen 53 is an example of a screen on which it is displayed such that whether the cloud server 12 is the forwarding destination that is associated with the information related to the FAX data can be identified.

While, a mark may be displayed on each of the cloud servers 12 that is not associated with the information related to the FAX data, the mark may not be displayed on each of the cloud servers 12 that is associated with the information related to the FAX data.

While, a mark may be displayed on each of the cloud servers 12 that is associated with the information related to the FAX data, another mark may be displayed on each of the cloud servers 12 that is not associated with the information related to the FAX data.

Further, while each of the cloud servers 12 that is associated with the information related to the FAX data may be displayed in red, each of the cloud servers 12 that is not associated with the information related to the FAX data may be displayed in black.

The selection screens 52 and 53 improve the convenience for the user to select one of the plurality of cloud servers 12 which is associated with the information related to the received FAX data, compared to the case where the cloud servers 12 are displayed regardless of the information related to the FAX data.

Other Embodiments

The present invention is not limited to the illustrated embodiments. It is to be understood that the present invention may be embodied with various changes and modifications that may occur to a person skilled in the art, without departing from the spirit and scope of the invention defined in the appended claims. For example, the following embodiments are also included in the scope of the invention.

In the illustrated embodiments, the FAX data is received by using the line communicator 24. On the other hand, the FAX data may be received from an external FAX apparatus that is connected to the communication network 14 by using the network communicator 27. In this case, the network communicator 27 functions as the data receiver and the data transmitter.

In the illustrated embodiments, as an example of information related to FAX data, the information indicating the attribute of the FAX data and the information indicating the sender of the FAX data were described. However, the information related to the FAX data is not limited to these. For example, the information indicating the attribute of the FAX data may include information indicating a data size of the FAX data. Further, the information related to the FAX data may be only the information indicating the attribute of the FAX data, or may be only the information indicating the sender of the FAX data.

In the illustrated embodiments, when the FAX data has been received by the automatic receiving, the selection screen 50 is not displayed. On the other hand, the selection screen 50 may be displayed even when the FAX data has been automatically received. For example, the FAX data that has been automatically received may be accumulated in the RAM 21C, and lighting of a predetermined LED may transmit the user that the FAX data is accumulated in the RAM 21C. Then, when the user notices that the FAX data is accumulated in the RAM 21C and operates the operating unit 23 to perform a forwarding instruction of the FAX data, the selection screen 50 may be displayed.

In the illustrated embodiments, the selection screen 50 is displayed on the display 22 of the FAX apparatus 10 or the display of the portable handset 15 so as to receive the user's selection of the cloud server 12 as the forwarding destination. On the other hand, the selection screen 50 may be displayed on a display of a PC (Personal Computer) or a smart phone that is connected to the FAX apparatus 10 through the communication network 14 so as to receive the user's selection of the cloud server 12.

In the second embodiment, when the telephone number of the sender of the received FAX data is stored in the EEPROM 21E, the selection screen 50 is displayed. On the other hand, when the telephone number of the sender of the received FAX data is stored in the EEPROM 21E, the selection screen 50 may not be displayed, and, when the telephone number of the sender of the FAX data is not stored in the EEPROM 21E, the selection screen 50 may be displayed. In other words, when it is desirable that the selection screen 50 is not displayed in a case of the specific sender, the telephone number of the specific sender may be stored in the EEPROM 21E.

In the second embodiment, when the CPU 21A judges that the telephone number of the sender of the FAX data is not stored in the EEPROM 21E in S401, the CPU 21A goes to S402 to forward the FAX data to the predetermined forwarding destination. On the other hand, when the telephone number of the sender of the FAX data is not stored in the EEPROM 21E, the CPU 21A may not forward the FAX data and may store the FAX data in the RAM 21C.

In the second and third embodiments, judging whether the forwarding setting is ON in S103 was described as an example. On the other hand, S103 may not be executed. In other words, when the CPU 21A judges the manual receiving of the FAX data in S101, the CPU 21A may go to S401 or S501.

In the illustrated embodiments, the cloud server 12 was described as an example of the forwarding destination. However, the forwarding destination is not limited to the cloud server 12. For example, the forwarding destination may be a FAX apparatus different from a FAX apparatus as a sender of the FAX data. In this case, the line communicator 24 is an example of the data transmitter. Further, the forwarding destination may be a file server that is connected to the communication network 14 in a system having the FAX apparatus 10.

Figure 7:
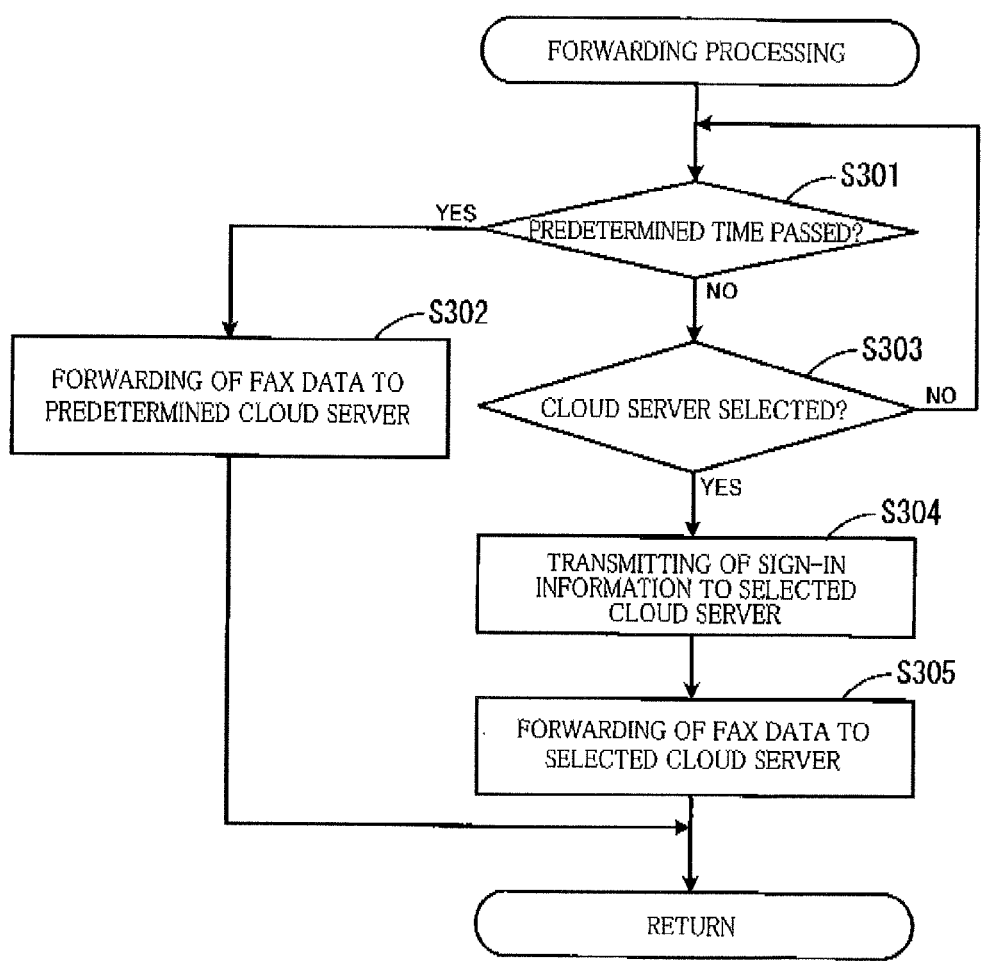
FIG. 7 is a flow chart showing a forwarding processing.

In the illustrated embodiments, in S301 illustrated in FIG. 7, when the CPU 21A judges that the predetermined period of time has passed, in S302, the FAX data is forwarded to the predetermined cloud server 12. On the other hand, the FAX data may not be forwarded and may be stored in the RAM 21C. Then, when the user operates the FAX apparatus 10, the selection screen 50 and so on may be displayed such that the FAX data is forwarded to the cloud server 12 that was selected by the user.

In the illustrated embodiments, the FAX apparatus 10 was described as an example of the facsimile apparatus. On the other hand, the facsimile apparatus may be a so-called Multi Function Device having a printer function, an image reader function, a copier function, a FAX function, and so forth.

In the illustrated embodiments, the CPU 21A executes each of the various kinds of processing. On the other hand, a part of these kinds of processing may be executed by the ASIC 21D. Further, the controller 21 may not comprise the ASIC 21D. Furthermore, the controller may comprise a plurality of CPUs, and the plurality of CPUs cooperate with each other to execute the above-described kinds of processing.

What is claimed is:

1. A facsimile apparatus comprising a data receiver, a data transmitter, and a controller,
    wherein the controller is configured to:
    receive facsimile data from another facsimile apparatus through the data receiver, the received facsimile data including related information which is information related to the facsimile data;
    output a screen on which at least one forwarding destination indicator indicating a forwarding destination related to the related information of the received facsimile data is displayed in preference to at least one forwarding destination indicator indicating a forwarding destination which does not relate to the related information of the received facsimile data; and
    forward the received facsimile data through the data transmitter to at least one forwarding destination designated on the screen,
    wherein the facsimile apparatus further comprises a storage configured to store sign-in information for signing in to the forwarding destination of facsimile data, and
    wherein the controller is configured to output the screen on which at least one forwarding destination indicator indicating the forwarding destination related to the related information of at least one forwarding destination, the sign-in information of which is stored in the storage, is displayed, and at least one forwarding destination indicator, indicating the forwarding destination, the sign-in information of which is not stored in the storage, is not displayed.

2. The facsimile apparatus according to claim 1, wherein the related information indicates whether chromatic color is included in an image represented by the facsimile data.

3. The facsimile apparatus according to claim 1, wherein the related information indicates a quality of an image represented by the facsimile data.

4. The facsimile apparatus according to claim 1, wherein the controller is configured to output the screen on which the at least one forwarding destination indicator indicating the forwarding destination which does not relate to the related information is not displayed.

5. The facsimile apparatus according to claim 1, wherein the controller is configured to output the screen on which the at least one forwarding destination indicator indicating the forwarding destination related to the related information is displayed prior to the at least one forwarding destination indicator indicating the forwarding destination which does not relate to the related information.

6. The facsimile apparatus according to claim 1,
wherein the controller is configured to receive setting information whether the facsimile data is set to be forwarded, and
the controller is configured to output the screen when the facsimile data is set to be forwarded, and the controller is configured not to output the screen when the facsimile data is not set to be forwarded in the setting processing.

7. The facsimile apparatus according to claim 1, further comprising a display and an operating unit,
wherein the controller is configured to:
receive a receiving instruction of the facsimile data by the operating unit;
receive the facsimile data from said another facsimile apparatus in response to receiving of the receiving instruction; and
output the screen on the display when the controller receives the receiving instruction.

8. The facsimile apparatus according to claim 1, wherein the controller is configured to;
prior to receiving the facsimile data, transmit an ability of the facsimile apparatus to a sender of the facsimile data;
after transmitting the ability, receive the related information of the facsimile data; and
output the screen based on the related information which the controller received after transmitting the ability.

9. The facsimile apparatus according to claim 1, further comprising a storage configured to store judgment information for judging, in accordance with a sender as said another facsimile apparatus of the facsimile data, whether the controller outputs the screen,
wherein the controller is configured to:
judge, based on the judgment information, whether the sender of the received facsimile data is a first sender, and
output the screen when it is judged that the first sender.

10. The facsimile apparatus according to claim 9,
wherein the controller is configured to:
receive identification information for identifying the sender when a telephone line between the facsimile apparatus and the sender of the facsimile data is closed, and
identify the sender according to the received identification information.

11. The facsimile apparatus according to claim 1, further comprising a storage configured to store, the sender of the facsimile data and the forwarding destination, so as to be associated with each other,
wherein the controller is configured to output the screen when the sender of the received facsimile data is not associated with the forwarding destination stored in the storage.

12. The facsimile apparatus according to claim 1,
wherein the controller is configured to:
output the screen capable of identifying whether a forwarding destination is one of the at least one forwarding destination related to the related information of the received facsimile data; and
forward the received facsimile data through the data transmitter to the identified forwarding destination designated on the screen.

13. The facsimile apparatus according to claim 1, further comprising a display,
wherein the storage is configured to further store the forwarding destination and the related information of the facsimile data, so as to be associated with each other,
wherein the controller is configured to:
receive the facsimile data including the related information;
determine whether the related information included in the received facsimile data is identical to the related information of the forwarding destination stored in the storage; and
output the screen on the display on which the forwarding destination indicator of the forwarding destination determined that the related information of which is identical to the related information included in the received facsimile data is displayed, and the forwarding destination indicator of the forwarding destination determined that the related information of which is not identical to the related information included in the received facsimile data is displayed in gray-out.

14. A data forwarding method of a facsimile apparatus comprising a data receiver and a data transmitter, the method comprising the steps of:
receiving facsimile data including related information which is information related to the facsimile data from another facsimile apparatus through the data receiver;
outputting a screen on which at least one forwarding destination indicator indicating a forwarding destination related to the related information of the received facsimile data is displayed in preference to at least one forwarding destination indicator indicating a forwarding destination which does not relate to the related information of the received facsimile data; and
forwarding the received facsimile data through the data transmitter to at least one forwarding destination designated on the screen,
wherein the facsimile apparatus further comprises a storage configured to store sign-in information for signing in to the forwarding destination of facsimile data; and
wherein the method further comprises the step of:
outputting the screen on which at least one forwarding destination indicator indicating the forwarding destination related to the related information of at least one forwarding destination, the sign-in information of which is stored in the storage, is displayed, and at least one forwarding destination indicator, indicating the forwarding destination, the sign-in information of which is not stored in the storage, is not displayed.

15. A facsimile apparatus comprising a data receiver, a data transmitter, and a controller, wherein the controller is configured to: receive facsimile data from another facsimile apparatus through the data receiver, the received facsimile data including related information which is information related to the facsimile data;

output a screen on which at least one forwarding destination indicator indicating a forwarding destination related to the related information of the received facsimile data is displayed in preference to at least one forwarding destination indicator indicating a forwarding destination which does not relate to the related information of the received facsimile data; and forward the received facsimile data through the data transmitter to at least one forwarding destination designated on the screen, wherein the facsimile apparatus further comprises a display and an operating unit, and wherein the controller is configured to:

receive a receiving instruction of the facsimile data from the operating unit;

receive the facsimile data from said another facsimile apparatus in response to receiving of the receiving instruction; and output the screen on the display when the controller receives the receiving instruction.

16. The facsimile apparatus according to claim 15, further comprising a storage configured to store the forwarding destination and the related information of the facsimile data, so as to be associated with each other, wherein the controller is configured to:

receive the facsimile data including the related information;

determine whether the related information included in the received facsimile data is identical to the related information of the forwarding destination stored in the storage; and output the screen on the display on which the forwarding destination indicator of the forwarding destination determined that the related information of which is identical to the related information included in the received facsimile data is displayed, and the forwarding destination indicator of the forwarding destination determined that the related information of which is not identical to the related information included in the received facsimile data is displayed in gray-out.

17. The facsimile apparatus according to claim 15, wherein the controller is configured to:

prior to receiving the facsimile data, transmit an ability of the facsimile apparatus to a sender of the facsimile data;

after transmitting the ability, receive the related information of the facsimile data; and output the screen based on the related information which the controller received after transmitting the ability.

18. The facsimile apparatus according to claim 15, further comprising a storage configured to store judgment information for judging, in accordance with a sender as said another facsimile apparatus of the facsimile data, whether the controller output the screen, wherein the controller is configured to:

judge, based on the judgment information, whether the sender of the received facsimile data is a first sender, and output the screen when it is judged that the first sender.

19. The facsimile apparatus according to claim 18, wherein the controller is configured to:

receive identification information for identifying the sender when a telephone line between the facsimile apparatus and the sender of the facsimile data is closed, and identify the sender according to the received identification information.

20. The facsimile apparatus according to claim 15, further comprising a storage configured to store, a sender of the facsimile data and the forwarding destination, so as to be associated with each other, wherein the controller is configured to output the screen when the sender of the received facsimile data is not associated with the forwarding destination stored in the storage.

* * * * *